Patented May 19, 1936

2,041,647

UNITED STATES PATENT OFFICE 2,041,647

IMPREGNATING COMPOSITION FOR WOOD AND THE LIKE

Frank H. Lyons, Central, N. Mex., assignor to E. L. Bruce Company, Memphis, Tenn., a corporation of Delaware No Drawing. Application March 20, 1934, Serial No. 716,552

3 Claims. (Cl. 134—78.6)

My invention relates to impregnating compositions for wood and the like and has particularly in view a non-aqueous composition that may be used for impregnating wood with an insecticide that will protect the wood against termites and rot fungi.

Heretofore, β-naphthol and other organic toxicants have been used as insecticides, dissolved in various organic solvents and using as a carrying medium preferably varnish makers' and painters' (V. M. & P.) naphtha, on account of its cheapness. Other petroleum solvents can be used as carrying agents such as gasoline and kerosene and also the well known coal tar products, benzol, xylol and toluol. β-naphthol, however, is not sufficiently soluble in these carrying agents and so it has been necessary to first dissolve the B-naphthol in other solvents which are miscible with the carrying agent, such as ethyl alcohol.

Such solvents are more expensive than the carrying agent and by utilizing a small proportion of such solvent relative to the carrying agent, I am enabled to substantially lower the cost of the completed composition without affecting its efficiency.

When using ethyl alcohol, a certain amount of rosin is added which acts as a blending agent, to make the ethyl alcohol and V. M. & P. naphtha miscible and produce a clear solution. Instead of using ethyl alcohol with rosin, I may substitute therefor without rosin, such as isopropyl alcohol, butyl alcohol, amyl alcohol and ethyl acetate; also acetone with rosin.

There are many other organic toxicants than β-naphthol that are soluble in alcohol and that can be dissolved in a rosin and varnish makers' and painters' naphtha medium. The following are found to be adaptable for this purpose:

p-Dichlorobenzene, 1-3-5-trichlorobenzene, m-dihydroxy-benzene (resorcinol), o-dihydroxy-benzene (catechol), 1-2-3-trihydroxybenzene (pyrogallol), mono-benzene-sulphonic acid, diphenyl, alpha-naphthol, alpha-naphthylamine, beta-chloro-naphthalene, alpha-nitro-naphthalene and orthophenylphenol.

Instead of using rosin in the composition as a blending agent, I may use calcium resinate, which is a limed rosin and also ester gums, which are the esters of abietic acid. The active agent in rosin is abietic acid. The following may be used in place of abietic acid: stearic acid, oleic acid, Canada balsam, linseed oil acids, chinawood oil acids and palmitic acid. In addition, the products formed by the partial neutralization of these acids by organic or inorganic bases as well as the esters of these acids may be used.

Under certain conditions of storage, there may be precipitation of some of the toxic from solution and in order to obviate this condition, I have discovered that by a proper selection of the solvent for the β-naphthol, this can be inhibited If the solvent is of lower boiling point than the carrying agent, the solvent will evaporate first and there will be precipitation of some of the toxicant from solution. However, if the boiling range of the solvent is within the last half of the boiling range of the carrier, any evaporation of the carrier will begin to take place first and there will be no precipitation of the toxicant from solution, while the composition is in storage.

The solvent for the β-naphthol or other toxicant should have the following properties:

1. Miscible with V. M. & P. naphtha.
2. High solvent power for the β-naphthol.
3. A boiling range in the last half of the boiling range of the naphtha so that evaporation of the naphtha will begin before evaporation of the solvent.
4. Freedom from objectionable odor.
5. Non-staining of the wood.
6. Non-poisonous to human beings.

Boiling range of V. M. & P. naphtha transformed to degrees centigrade is between 144° C. and 212° C.

The following solvents are found to be satisfactory when used with a carrier having the proper boiling range:

| | Centigrade |
|---|---|
| 1. Monobutyl ether of diethylene glycol, boling point | 222° |
| 2. Monobutyl ether of ethylene glycol, boiling point | 170.6° |
| 3. Monoethyl ether of diethylene glycol, boiling point | 198° |
| 4. Monoethyl ether of ethylene glycol, boiling point | 134.8° |
| 5. Monoethyl ether ethylene glycol acetate salt, boiling point | 153° |
| 6. Dichlorethyl ether | 178° |
| 7. Monomethyl ether of ethylene glycol | 124½° |

Some of these, for example, monoethyl ether of diethylene glycol, requires a blending agent to carry them completely into solution in V. M. & P. naphtha. Monobutyl ether of ethylene glycol shows the best properties of all the above solvents.

A large number of other solvents for β-naphthol, without the use of rosin or other blending agents, may be used which have the desired relative lower boiling points. The following examples will suffice to show the field from which such solvents may be selected.

Using the proportion of 10 gms. of β-naphthol and 200 cc. of V. M. & P. naphtha, the following may be used:

1. 24 cc. amyl acetate
2. 100 cc. dichlorethyl ether (less oleum spirits required)

3. 15 cc. monobutyl ether of ethylene glycol
4. 20 cc. monobutyl ether of diethylene glycol
5. 24 cc. cyclohexanol
6. 30 cc. cyclohexanone
7. 16 cc. ethyl lactate
8. 1 cc. monobutyl ether of ethylene glycol
   8 cc. monobutyl ether of diethylene glycol
9. 10 cc. monobutyl ether of ethylene glycol
   10 cc. dichlorethyl ether
10. 5 cc. monobutyl ether of ethylene glycol
    5 cc. monobutyl ether of diethylene glycol
    10 cc. dichlorethyl ether
11. 3 cc. monobutyl ether of ethylene glycol
    5 cc. monobutyl ether of diethylene glycol
    2 cc. diacetone acetate
12. 5 cc. monobutyl ether of ethylene glycol
    5 cc. dichlorethyl ether
    4 cc. dibutyl phthalate
13. 3 cc. monobutyl ether of ethylene glycol
    6 cc. diacetone acetate
    2 cc. dichlorethyl ether
14. 10 cc. monobutyl ether of diethlyene glycol
    12 cc. dichlorethyl ether
15. 10 cc. monobutyl ether of diethylene glycol
    5 cc. dibutyl phthalate
16. 4 cc. monobutyl ether of ethylene glycol
    5 cc. monobutyl ether of diethylene glycol
    200 cc. #3 enamel solvent
        (oleum spirits left out of this treat)
17. 8 cc monobutyl ether of ethylene glycol
    3 cc. monobutyl ether of diethylene glycol
    100 cc. #3 enamel solvent
    100 cc. oleum spirits (instead of 200 cc.)

β-naphthol is soluble in the above compositions up to about 5% by weight. When the volatile solvents evaporate, the β-naphthol crystallizes out in the pores of the wood. β-naphthol is sparingly soluble in water, yet enough to be toxic to fungi and wood eating insects. For an organic compound, it is comparatively non-volatile.

I claim:

1. An impregnating composition comprising a substantially non-volatile organic aromatic toxicant, a volatile organic solvent in which the toxicant is readily soluble and a volatile organic carrier with which the toxicant solution is miscible but in which the toxicant is substantially insoluble, the initial boiling point of the organic carrier being lower than that of the solvent whereby the organic carrier will begin to evaporate before the solvent evaporates.

2. An impregnating composition comprising a substantially non-volatile organic aromatic toxicant, a volatile organic solvent in which the toxicant is readily soluble and a volatile organic carrier with which the toxicant solution is miscible but in which the toxicant is substantially insoluble, the boiling range of the solvent being within the latter part of the boiling range of the carrier so that evaporation of the carrier will begin before evaporation of the solvent.

3. An impregnating composition comprising β-naphthol, a volatile organic solvent in which the β-naphthol is readily soluble, a volatile petroleum distillate with which the β-naphthol solution is miscible but in which the β-naphthol is substantially insoluble, the boiling range of the solvent being within the boiling range of the latter part of the petroleum distillate so that evaporation of the distillate will begin before evaporation of the solvent.

FRANK H. LYONS.